Sept. 11, 1956

M. W. SLATE 2,762,924

TUNING SYSTEM

Filed April 29, 1952

INVENTOR.
MATTHEW W. SLATE

BY Darby & Darby

ATTORNEYS

United States Patent Office 2,762,924
Patented Sept. 11, 1956

2,762,924

TUNING SYSTEM

Matthew W. Slate, New York, N. Y., assignor to Allen B. Du Mont Laboratories, Inc., Clifton, N. J., a corporation of Delaware Application April 29, 1952, Serial No. 284,885

8 Claims. (Cl. 250—40)

This invention relates to tuning systems in which the resonant frequency of an electrical circuit may be selectively varied.

An object of the invention is to provide a tuning system in which the resonant frequency of an electrical circuit is continuously variable over a wide range of frequencies.

Another object is to provide a wide range tuning system for use at ultra high frequencies which does not require the use of sliding contacts.

Other objects will be apparent from the description and drawing in which.

Figure 1:
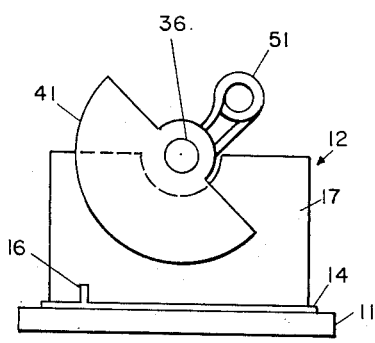
Figure 1 is a front elevational view of a tuning device used as a part of the invention.
Figure 2:
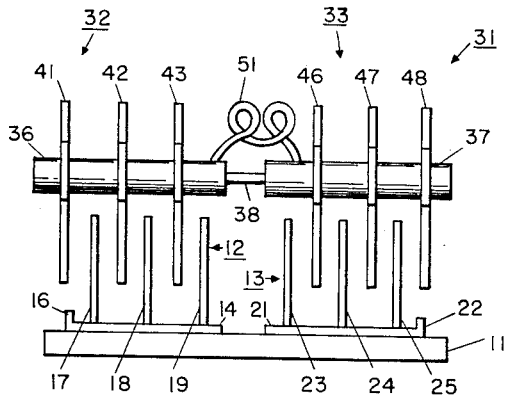
Figure 2 is a side elevational view of the device of Figure 1.

In Figures 1 and 2, a base support 11 of electrically insulative material has mounted thereon a first set 12 of stator plates and a second set 13 of stator plates. The first set 12 of stator plates comprises an electrically conductive support member 14 having a connector terminal 16 and one or more stator plates 17, 18, 19 attached perpendicularly thereto and arranged in a mutually parallel spaced relationship. The second set 13 of stator plates comprises an electrically conductive support 21 having a terminal 22 and one or more stator plates 23, 24, 25 attached perpendicularly thereto and arranged in mutually parallel spaced relationship.

A rotor assembly 31 comprises a first set 32 of rotor plates and a second set 33 of rotor plates, each set of rotor plates being respectively mounted on conductive shafts 36 and 37 which are arranged on a common axis and connected together by an electrically insulative coupling member 38. The first set 32 of rotor plates comprises one or more plates 41, 42, 43 attached to the shaft 36 in an axially spaced manner. Similarly the second set 33 of rotor plates comprises one or more electrically conductive plates 46, 47, 48 attached to the shaft 37 in an axially spaced manner. The shaft assembly comprising the elements 36, 37, 38 is mounted with respect to the stator assemblies 12 and 13 so that the rotor plates will mesh with the respective stator plates when the shaft assembly is rotated. An inductance element 51 is attached to the rotor assembly, the ends thereof being connected respectively to the shaft portions 36 and 37 and hence to the sets 32 and 33 of rotor plates.

Figure 3:
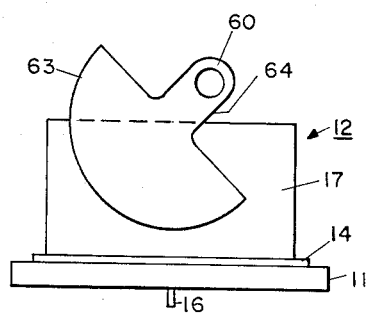
Figure 3 is a front elevational view of an alternative embodiment of the device of Figure 1.
Figure 4:
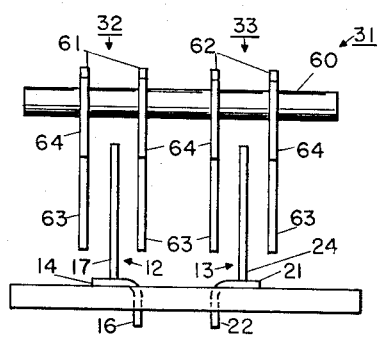
Figure 4 is a side elevational view of the device of Figure 3.

In Figures 3 and 4, the insulative base 11 has mounted thereon first and second stator assemblies 12 and 13, each comprising an electrically conductive support plate 14 and 21 respectively having terminals 16 and 22 respectively extending through the base 11, and each stator assembly comprising one or more stator plates 17 and 24 respectively mounted thereon as has been described above. If each stator assembly comprises a single plate, electrical connections may be made directly thereto, and the support plates 14 and 21 may be eliminated. The rotor assembly comprises an electrically conductive shaft 60 positioned in an axially offset manner with respect to the stator assemblies 12, 13 and having attached thereto a first rotor assembly 32 and a second rotor assembly 33, each rotor assembly comprising one or more electrically conductive plates 61 and 62 each having a capacitance portion 63 and an elongated inductive portion 64 located between the capacitance portion 63 and the point of attachment of the plate to the shaft 60. The elongated portions 64, taken collectively, form the inductance 51 shown in Figures 1 and 2. A portion of the shaft 60 between the rotor assemblies 32, 33 will also form a part of the inductance 51, under certain conditions.

The rotor assembly 31 comprising the first and second rotor plate assemblies 32 and 33 is positioned with respect to the stator assemblies 12 and 13, so that the rotor plates of the rotor assemblies 32 and 33 may be meshed with the respective plates of the stator assemblies 12 and 13, when the shaft 60 is rotated. When the rotor and stator plates are meshed, there is no electrical connection made therebetween; however, a capacitance is formed between the rotor and stator plates, which capacitance becomes greater as the plates are more fully meshed. In this embodiment, one or more of the rotor plates 61, 62 are positioned to come between the stator assemblies 12, 13, thereby reducing the capacitance between the stator assemblies when the rotor plates are enmeshed therewith.

Figure 5:
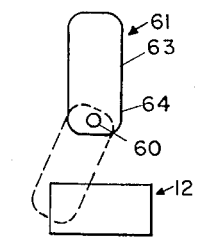
Figure 5 shows an alternative construction of the embodiment of Figure 3.

Figure 5 shows an economical rectangular construction of the rotor plates 61, 62. The dotted line shows the position of the rotor assembly 61 when partly enmeshed with the stator assembly 12. In this construction, the elongated inductive portion 64 is not narrowed down as in the embodiment of Figure 3.

Figure 6:
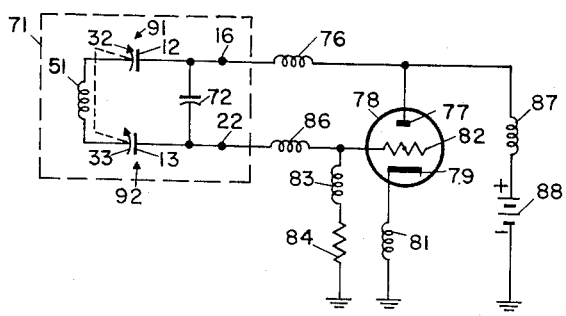
Figure 6 is a schematic electrical diagram of an oscillatory circuit which utilizes the invention.

In the schematic diagram of Figure 6, a dotted enclosure 71 indicates that portion of the circuit which may comprise either of the alternative embodiments of the tuning element shown in Figures 1 and 2 and in Figures 3 and 4. A capacitance 72 is provided by the mutually proximate spacing of the first and second sets 12 and 13 of stator assemblies. The connecting terminal 16 is connected through an inductance 76 to an anode 77 of an electronic amplifier device 78 which may be a thermionic tube or a transistor or the like. A cathode 79 is connected through an inductance 81 to ground. A control electrode 82, is connected to ground through a series combination of an inductance 83 and resistance 84, and to the connector terminal 22 through an inductance 86. The anode 77 is connected through an inductance 87 to a source 88 of voltage having positive polarity. The inductances 76 and 86 form a part of the tuned circuit, of which the device 71 forms a part, which is connected between the anode 77 and the control electrode 82 in order to form an oscillator circuit. The inductances 76 and 86 may, at ultra high frequencies, conveniently comprise the inductance of lead wires which connect the tuning circuit 71 to the tube elements. The inductances 81, 83 and 87 function to isolate the radio frequency portions of the circuit. Variable capacitances 91, 92 are formed by the rotor and stator assemblies 32, 12 and 33, 13, respectively.

The invention operates as follows: At the higher frequency end of the tuning range, the rotor and stator plates are unmeshed. The resonant frequency of the circuit is then determined mainly by the inductances 76 and 86 in combination with the capacitance 72 along with stray capacitances in the circuit. Under this condition, the tuning inductance 51 has relatively small effect on the resonant frequency of the tuned circuit. To tune to a lower resonant frequency, the tuning shaft of the device is rotated so that the rotor and stator plates partially mesh, whereupon the resonant frequency of the circuit is lowered both because of the increased capacitance 91, 92 of the circuit provided by the enmeshed rotor and stator elements and also because the inductance 51 is effectively made a part of the tuned circuit. When the rotor and stator plates are fully enmeshed, the inductance 51 has its maximum effect in the tuned circuit, as do the capacitances 91, 92 formed by the rotor and stator plates. If one or more rotor plates are located between the stator assemblies as shown in Figure 4, the parallel capacitance 72 becomes reduced as the series capacitances 91, 92 become increased, thereby increasing the tuning range.

Increased tuning range is provided by the invention due to the fact that both capacitance and effective inductance of the circuit are varied when the circuit is tuned, and also due to the novel arrangements of circuit elements. Although the invention is shown incorporated in a series tuned oscillator circuit, it is applicable to many sorts of tuned circuits.

While preferred embodiments of the invention have been described, various modifications thereof will be apparent to those skilled in the art, which modifications will fall within the scope of the invention as defined in the appended claims.

What is claimed is:

1. A tuned electrical circuit comprising a source of electric signals, a first inductance and a first capacitance connected in series across said signal source, a pair of ganged variable condensers each having a set of stator plates and a set of rotor plates, the stator plates of one condenser being connected to one end of said first capacitance and the stator plates of the other condenser being connected to the other end of said first capacitance, and a second inductance connected between the sets of rotor plates of said pair of variable condensers.

2. The circuit in accordance with claim 1, in which said second inductance comprises elongated portions of said rotor plates.

3. An electrical tuning device comprising a first stator plate and a second stator plate positioned to form a capacitance therebetween, a source of electric signals connected across said stator plates, a first rotor plate adjustably positioned with respect to said first stator plate, a second rotor plate adjustably positioned with respect to said second stator plate, and an inductance connected between said first and second rotor plates.

4. The device in accordance with claim 3, in which said rotor plates are attached to a shaft having an insulator portion therebetween.

5. The device in accordance with claim 3, in which said inductance comprises elongated portions of said rotor plates.

6. The device in accordance with claim 3, in which at least one of said rotor plates is attached to a shaft and comprises a capacitive portion and an elongated portion between said capacitive portion and the point of attachment to said shaft.

7. A tunable oscillatory circuit comprising a thermionic tube having at least a pair of electrodes, a first inductance having its one end connected to one of said electrodes, a second inductance having its one end connected to the other of said electrodes, a first capacitance connected between the other end of said first inductance and the other end of said second inductance, a first variable condenser having its stator connected to the other end of said first inductance, a second variable condenser having its stator connected to the other end of said second inductance and a third inductance connected between the rotors of said variable condensers.

8. The circuit in accordance with claim 7 wherein said variable condensers are ganged.

References Cited in the file of this patent

UNITED STATES PATENTS

| | | |
|---|---|---|
| 1,761,211 | Jones et al. | June 3, 1930 |
| 2,341,345 | Van Billiard | Feb. 8, 1944 |
| 2,415,141 | Malling | Feb. 4, 1947 |
| 2,420,657 | Dodds et al. | May 20, 1947 |
| 2,422,454 | Weiss | June 17, 1947 |
| 2,453,489 | Bruntil et al. | Nov. 9, 1948 |
| 2,491,480 | Davis et al. | Dec. 20, 1949 |
| 2,492,748 | Hibberd | Dec. 27, 1949 |
| 2,505,022 | Wheeler | Apr. 25, 1950 |
| 2,521,963 | Beusman | Sept. 12, 1950 |
| 2,540,137 | Page | Feb. 6, 1951 |
| 2,542,416 | Kach et al. | Feb. 20, 1951 |
| 2,561,087 | Anderson | July 17, 1951 |
| 2,568,715 | Brown et al. | Sept. 25, 1951 |